(12) United States Patent
Hasan et al.

(10) Patent No.: US 7,631,222 B2
(45) Date of Patent: Dec. 8, 2009

(54) METHOD AND APPARATUS FOR CORRELATING EVENTS IN A NETWORK

(75) Inventors: Masum Z. Hasan, Cupertino, CA (US); L. Alexander Clemm, Los Gatos, CA (US); Petre Dini, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 915 days.

(21) Appl. No.: 10/924,702

(22) Filed: Aug. 23, 2004

(65) Prior Publication Data

US 2006/0041659 A1    Feb. 23, 2006

(51) Int. Cl.
    *G06F 11/00* (2006.01)
(52) U.S. Cl. ......................................... 714/26
(58) Field of Classification Search .................. 714/47, 714/26
    See application file for complete search history.

(56) References Cited

U.S. PATENT DOCUMENTS

| | | | |
|---|---|---|---|
| 5,309,448 A * | 5/1994 | Bouloutas et al. ............. | 714/25 |
| 5,325,522 A | 6/1994 | Vaughn | |
| 5,408,218 A * | 4/1995 | Svedberg et al. ............ | 340/507 |
| 5,734,697 A | 3/1998 | Jabbarnezhad | |
| 5,768,501 A * | 6/1998 | Lewis .......................... | 714/48 |
| 5,922,051 A | 7/1999 | Sidey | |
| 6,052,722 A | 4/2000 | Taghadoss | |
| 6,154,129 A | 11/2000 | Kajitani et al. | |
| 6,167,448 A | 12/2000 | Hemphill et al. | |
| 6,243,746 B1 | 6/2001 | Sondur et al. | |
| 6,253,243 B1 | 6/2001 | Spencer | |
| 6,263,455 B1 | 7/2001 | Bannister | |
| 6,271,845 B1 | 8/2001 | Richardson | |
| 6,349,333 B1 | 2/2002 | Panikatt et al. | |
| 6,356,885 B2 * | 3/2002 | Ross et al. .................... | 706/45 |
| 6,393,386 B1 * | 5/2002 | Zager et al. ................... | 703/25 |

(Continued)

FOREIGN PATENT DOCUMENTS

WO    WO 02/21774 A1 *    6/2001

OTHER PUBLICATIONS

Smarts, "InCharge™ Service Assurance Solutions (Managing IT to Meet Business Goals)", Data Sheet, DOC252.0504, 2 pgs., White Plains, New York, .smarts.com.

(Continued)

*Primary Examiner*—Scott T Baderman
*Assistant Examiner*—Yair Leibovich
(74) *Attorney, Agent, or Firm*—Hickman Palermo Truong & Becker LLP

(57) ABSTRACT

A uniquely configured data structure is used to store event information for each network entity, where logical and physical dependency relationships among entities are captured in the data structure. For each entity, the data structure is configured to store (a) a "genuine event set", which includes a list of events that originated in association with the entity; and (b) a "derived event set", which includes a list of records in which each record is associated with an event that originated in association with an entity that has a dependency relationship (e.g., layering or topological) with the entity. The derived event set may simply comprise references to the genuine event sets for entities that have a dependency relationship with the entity.

60 Claims, 7 Drawing Sheets

U.S. PATENT DOCUMENTS

| | | | |
|---|---|---|---|
| 6,456,306 | B1 | 9/2002 | Chin et al. |
| 6,513,129 | B1 | 1/2003 | Tentij et al. |
| 7,039,921 | B2 | 5/2006 | Shah et al. |
| 7,299,277 | B1 | 11/2007 | Moran et al. |
| 7,409,676 | B2 * | 8/2008 | Agarwal et al. ............. 717/120 |
| 2001/0014886 | A1 | 8/2001 | Ross et al. |
| 2003/0005021 | A1 | 1/2003 | Shah et al. |
| 2003/0046582 | A1 * | 3/2003 | Black et al. ................. 713/201 |
| 2003/0061550 | A1 * | 3/2003 | Ng et al. ....................... 714/45 |
| 2003/0195959 | A1 | 10/2003 | Labadie et al. |
| 2005/0256956 | A1 * | 11/2005 | Littlefield et al. ........... 709/225 |

OTHER PUBLICATIONS

Smarts, "InCharge™ Service Assurance Manager (The Foundation For Integrated IT Management)", Data Sheet, DOC239.0404,4 pgs., White Plains, New York, .smarts.com.

Smarts, "InCharge™ Business Impact Manager (Business-Aware Infrastructure Management)", Data Sheet, DOC239.0404,2 pgs., White Plains, New York, .smarts.com.

Smarts, "InCharge™ Report Manager (Reporting Results of InCharge Intelligent Analysis)", Data Sheet, DOCXXX.0104, 2 pgs., White Plains, New York, .smarts.com.

Smarts, "InCharge™ Application Services Manager (Maximizing Availability and Performance of Mission-Critical Applications)", Data Sheet, DOC220.0104, 4 pgs., White Plains, New York, .smarts.com.

Smarts, "InCharge™ IP Availability Manager (Automating the Hardest Tasks in IT Management)", Data Sheet, DOC242.0404, 2 pgs., White Plains, New York, .smarts.com.

Smarts, "InCharge™ IP Performance Manager (Ensuring Top-Level Infrastructure Performance)", Data Sheet, DOC243.0404, 2 pgs., White Plains, New York, .smarts.com.

Smarts, InCharge™ ATM/Frame Relay Availability Manager (Topology Management, Root Cause and Impact Analysis of WAN Data Networks), Data Sheet, Doc.101.0502, 4 pgs., .smarts.com.

ILOG, "ILOG Jrules (Complete Business Rule Management)", Product Data Sheet, 03ds08, May 2003, 6 pgs., .ilog.com.

ILOG, "ILOG Business Rule Studio Developer Edition (The ILOG Rule Editor for Eclipse)", Product Data Sheet, 04ds11, Jun. 2004, 2 pgs., .ilog.com.

ILOG, "ILOG JConfigurator (Product and service modeling and configuration with rule management, deployment and execution)" Product Data Sheet, 03ds03, Mar. 2003, 4 pgs., log.com.

ILOG, "ILOG Business Rule Components (Business Rule Management, Deployment and Execution)", Product Data Sheet, 03ds04, Mar. 2003, 6 pgs., .ilog.com.

Jakobson et al., "Alarm Correlation—Correlating multiple network alarms improves", IEEE network, Nov. 1993.

"Alarm Correlation Engine (ACE)", IEEE 1998, Peng et al., pp. 733-742.

Canada 2,565,528, Office Action dated Mar. 4, 2009, 2 pgs.

Canada 2,565,528, Current Claims, dated Jul. 7, 2009, pp. 18-23.

* cited by examiner

READ FIRST DATA, FROM A DATA STRUCTURE ASSOCIATED WITH A FIRST NETWORK ENTITY, THAT COMPRISES A LIST OF EVENTS THAT ORIGINATED FROM THE FIRST ENTITY
502

READ SECOND DATA, FROM THE DATA STRUCTURE, THAT COMPRISES A LIST OF RECORDS IN WHICH EACH RECORD IS ASSOCIATED WITH AN EVENT THAT ORIGINATED FROM A NETWORK ENTITY THAT HAS A DEPENDENCY RELATIONSHIP WITH THE FIRST ENTITY
504

READ, FOR RECORDS IN THE SECOND DATA, INFORMATION THAT INDICATES HOW MANY NODES AWAY FROM A NODE THAT REPRESENTS THE FIRST ENTITY IN A NETWORK TOPOLOGY MODEL GRAPH, IS A NODE THAT REPRESENTS THE ENTITY FROM WHICH THE ASSOCIATED EVENT ORIGINATED
506

DETERMINE, BASED AT LEAST IN PART ON THE DATA STRUCTURE, EITHER THE LIKELIHOOD THAT AN EVENT IN THE NETWORK OTHER THAN A FIRST EVENT REPORTED IN ASSOCIATION WITH THE FIRST ENTITY, (A) CAUSED THE FIRST EVENT, OR (B) WAS CAUSED BY THE FIRST EVENT
508

IDENTIFY, BASED AT LEAST IN PART ON DATA STRUCTURES ASSOCIATED WITH VARIOUS NETWORK ENTITIES, EITHER A SET OF ONE OR MORE NETWORK EVENTS THAT (A) MAY HAVE CAUSED THE FIRST EVENT, OR (B) MAY HAVE BEEN CAUSED BY THE FIRST EVENT
510

*FIG. 5*

METHOD AND APPARATUS FOR CORRELATING EVENTS IN A NETWORK

FIELD OF THE INVENTION

The present invention generally relates to communications networks. The invention relates more specifically to a method and apparatus for correlating events in a network.

BACKGROUND

Network Layering and Topology

A fundamental principle of communication networks concerns interactions that take place along vertical and horizontal planes: layering and topology, respectively. The principle of layering has been clearly articulated in the ISO/OSI reference model, which implies vertical relationships in which the network entities of layer N are interacting with network entities of layer N−1. At the same time, topology implies horizontal relationships, in which two or more entities at layer N are logical or physical peers. A network can thus be abstracted as a graph, consisting of nodes (communications entities) and edges (representing topological and layering relationships). In many scenarios, communications entities of several communications layers co-reside in the same device. However, these entities are still clearly distinguished for management purposes, such as with physical ports and their logical interfaces.

A network management system can represent a network topology using a topology model that consists of both logical and physical objects. The logical objects are (a) logical or virtual protocol objects, such as TCP ports or connection end points, and (b) association objects that model relationships between objects, such as a connection or a route peer. A fault occurring in a network, such as an interface failure, may potentially affect any other object in the network, thus potentially causing other events to occur, or issue, at those other objects. This is because the other objects have recognized a symptom of the fault that is the original event.

Because of the multiple relationships and interdependencies between entities in a network, many abnormal events occurring during network operations have ripple effects across the network. An event happening at a layer N may have a chain-reaction in the vertical direction, from N to N+1; and in the horizontal direction, along the peers at layer N. N:N+1 and N:N chain-reactions may propagate recursively. The same underlying root cause can thus cause a multitude of events to be issued from interacting entities across the network. Hence, an event issuing at a given entity can be related to events issuing in entities in both horizontal and vertical directions across the network. Furthermore, as a fault propagates through the network, the events or alarms issued at affected nodes do not have the same data elements, data format, or content.

In general, a system event can be described as a state transition of a component of the system. In the context of a communications network, an event can be described as a state transition of a communication entity in the network, such as a router port or a logical interface. More specifically, in the context of a fault event in a communications network, a fault event can be described as a state transition of a network entity from a normal state to a faulty state.

Event Correlation

Event correlation is an important function in fault management systems, to identify events that are likely triggered by the same root cause. Event correlation is used to analyze and pare down significant numbers of events that might otherwise inundate users and applications, to more quickly and effectively take appropriate action in response to the root cause.

One approach to determining what other events are related to an event issued at a failed entity involves traversing a topology graph, which represents the network topology using a graph of interconnected nodes with the interconnections representing logical or physical dependencies between the entities represented by the nodes. However, such a brute-force traversal is not optimal and practical.

Hence, one common problem with event correlation involves handling the combinatorial explosion of event combinations that might be correlated and, therefore, having correlation algorithms that work properly with thousands or millions of events. The challenges regarding scale are a significant issue in any systems that are based on an inference engine or rule processing.

For example, with rule-based systems without a topology model, event correlation rules are encoded using a rule language, such as Prolog, CLIPS, or others. The possible cause-effect relationships between various events (such as E1 causes E2) are enumerated in advance as much as possible and encoded in the rules. At run time, the rule engine correlates input events by traversing (or "inferencing" on) the implicit cause-effect graph. Transitive relationships need not be encoded since the rule engine is able to deduce those relationships during the traversal or inference process.

With topology-based systems, an explicit topology model (i.e., a graph) of the network is used to correlate events happening in the objects (i.e., nodes) in the model. There are two major approaches to event correlation in topology-based systems: (a) approaches based on event propagation models, and (b) approaches based on heuristics. With the event propagation model approach, the topology model is augmented with event propagation "rules" or statements. The rules state how events are propagated along associated objects of the topology, leading to inference chains that fire along the presence of events and relationships of affected objects. With the heuristics-based approach, appropriate domain knowledge is employed to correlate events occurring in the objects of the topology model.

Various commercial fault management systems support event correlation, with most of these systems supporting causal event correlation. With some approaches, a user is required to write, and maintain, complex causal propagation "rules" using the language provided with the associated software development kit. In other deductive rule-based fault management systems, a user is required to write complex (AI-type) rules. Even if the fundamental rules are packaged with the system, a user is still required to write the deductive "rules" that apply to the relevant network. With each approach, correlation occurs through inferring, instantiating rules, and traversing search spaces that grow polynomially, if not exponentially, with the number of events and the size and complexity of the network.

Based on the foregoing, there is a clear need for a more efficient and scalable event correlation technique that exploits knowledge of relationships between entities in a network to restrict the correlation search space.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a flow diagram that illustrates a method for correlating events occurring in a network of communication entities, according to an embodiment;

DETAILED DESCRIPTION

A method and apparatus for scalable auto-correlation of events is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0 | General Overview | |
| 2.0 | Structural and Functional Overview | |
| 3.0 | Method of Correlating Events In a Network | |
| 4.0 | Implementation Mechanisms | |
| | 4.1 | Operating Environment Example |
| | 4.2 | Hardware Overview |
| 5.0 | Extensions and Alternatives | |

1.0 General Overview

The needs identified in the foregoing Background, and other needs and objects that will become apparent for the following description, are achieved in the present invention, which comprises, in one aspect, a method for correlating events occurring in a network.

In one embodiment, a uniquely configured data structure is used to store event information for each network entity, where logical and physical dependency relationships among entities are captured in the data structure. Therefore, inferences that would normally be performed by a fault management system (e.g., an inference engine) while traversing a network topology model are effectively mapped into the respective data structures. Consequently, fault management systems are no longer required to traverse an entire network topology model when performing inferences in support of root cause analysis, such as with event correlation functions, in pursuit of diagnosing and remedying the root cause of a fault in the network.

2.0 Structural and Functional Overview 2.1 Network Topology Model Graph

An "auto-correlation" data structure described herein can be used for correlating events in a network. A system or algorithm that utilizes the data structure operates in conjunction with a logical network topology model graph ("graph").

Figure 1A:
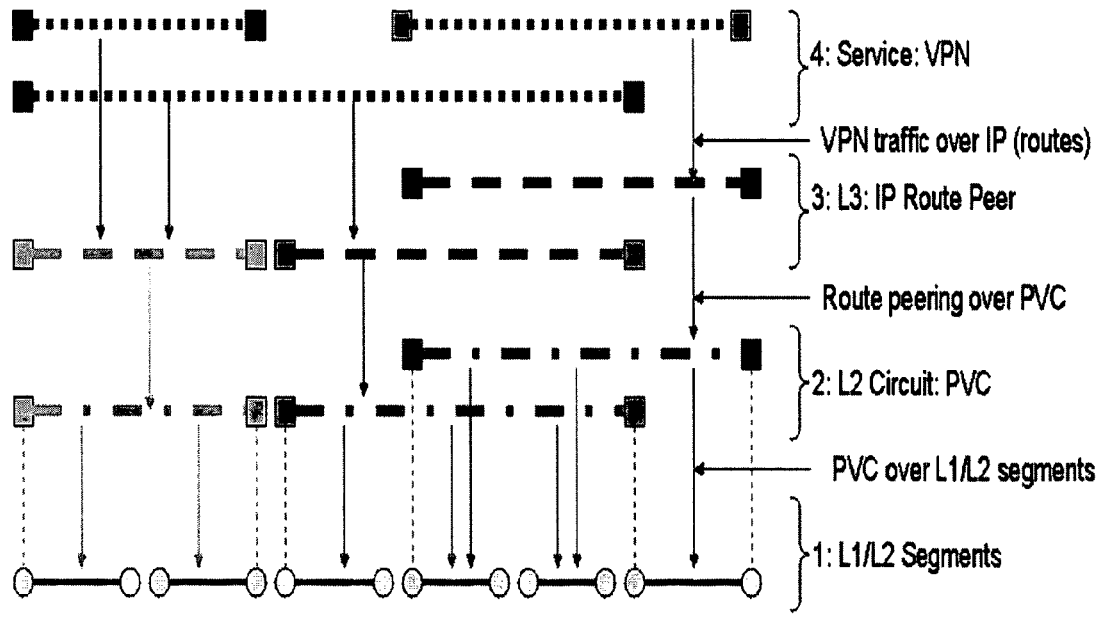
FIG. 1A is a diagram that illustrates an example of a topology model on which a network topology model graph may be based.

FIG. 1A is a diagram that illustrates an example of a topology model on which a network topology model graph may be based. A topology model on which the graph may be based consists of the following: (a) logical and physical objects modeling logical and physical entities in the network; (b) logical association objects modeling logical and physical relationship between entities in the network; and (c) logical X-over-Y association objects.

Figure 1B:
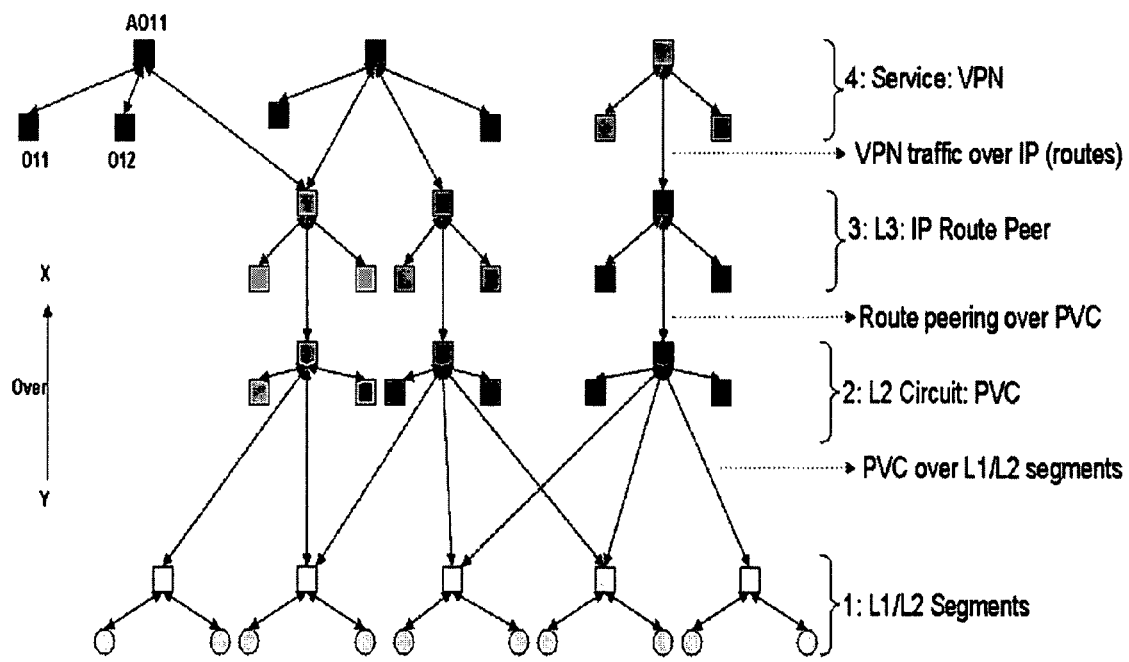
FIG. 1B is a diagram that illustrates an example of a network topology model graph, based on the topology model of FIG. 1A, on which an auto-correlation data structure may be based.

FIG. 1B is a diagram that illustrates an example of a network topology model graph, based on the topology model of FIG. 1A, on which an auto-correlation data structure may be based. The graph of FIG. 1B consists of (a) nodes representing communications entities that can have events issued against them (represented as squares and circles) and (b) edges representing (b1) topology relationships ("horizontal") used to model routing and data path topology knowledge, and (b2) layering relationships ("vertical") between nodes (represented as lines connecting nodes). A network device may comprise multiple communications entities. Edges are directional to indicate dependencies, i.e., an upper layer node is dependent on a lower layer node but not vice versa, and, likewise topologies may be directional as in the case of control communications. When a given entity is dependent on another entity, the given entity cannot function properly (or may not even exist) when the entity on which the given entity is dependent is not functioning properly. A particular instance of the model for a particular network can be populated in a variety of ways, for example, from a network inventory.

2.2 Data Structure

An event correlation system can exploit knowledge of relationships between entities in a network to restrict the correlation search space. Particularly, there is a considerable chance that events occurring at layer N+1 are related to events occurring at layer N, and events occurring at one entity are related to events occurring at a peer entity. Therefore, a unique data structure that captures such relationships between entities is generated for and associated with each entity in the network. The data structure provides a scalable mechanism for auto-correlation of events occurring in the network. For example, in the context of fault-related events, the data structure can be utilized for root cause fault analyses of the network.

Figure 2:
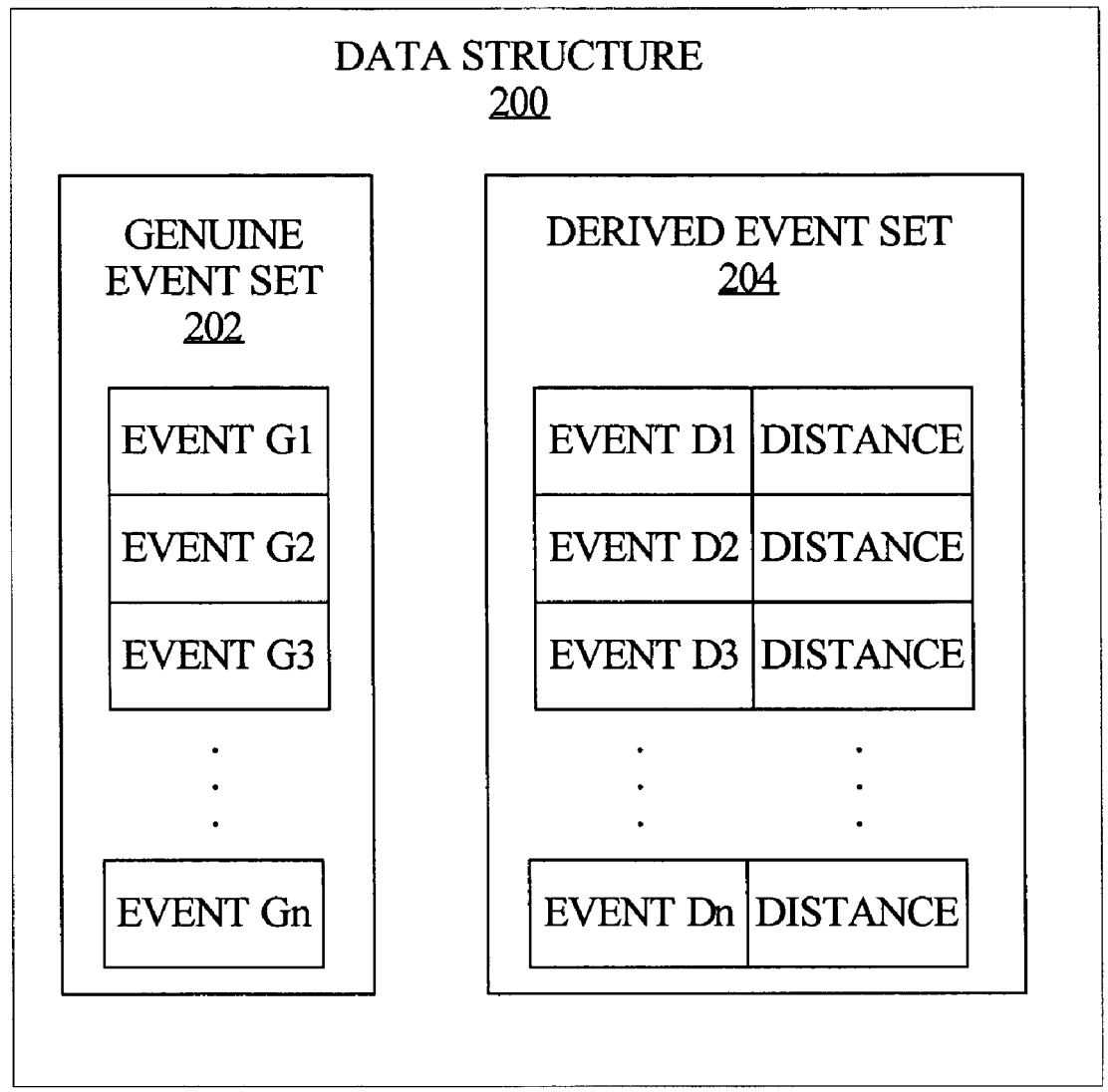
FIG. 2 is a block diagram that illustrates a general configuration of a data structure used to track and correlate events occurring in a network, according to an embodiment.

FIG. 2 is a block diagram that illustrates a general configuration of a data structure used to track and correlate events occurring in a network, according to an embodiment.

Data structure 200 is configured to store (a) a first set of data, which includes a list of events, depicted as events G1-event Gn, that originated in association with the entity to which the data structure is associated, i.e., a "genuine event set" 202; and (b) a second set of data, which includes a list of records in which each record is associated with an event, depicted as events D1-event Dn, that originated in association with an entity that has a dependency relationship (e.g., layering or topological) with the entity to which the data structure is associated, i.e., a "derived event set" 204.

Figure 3:
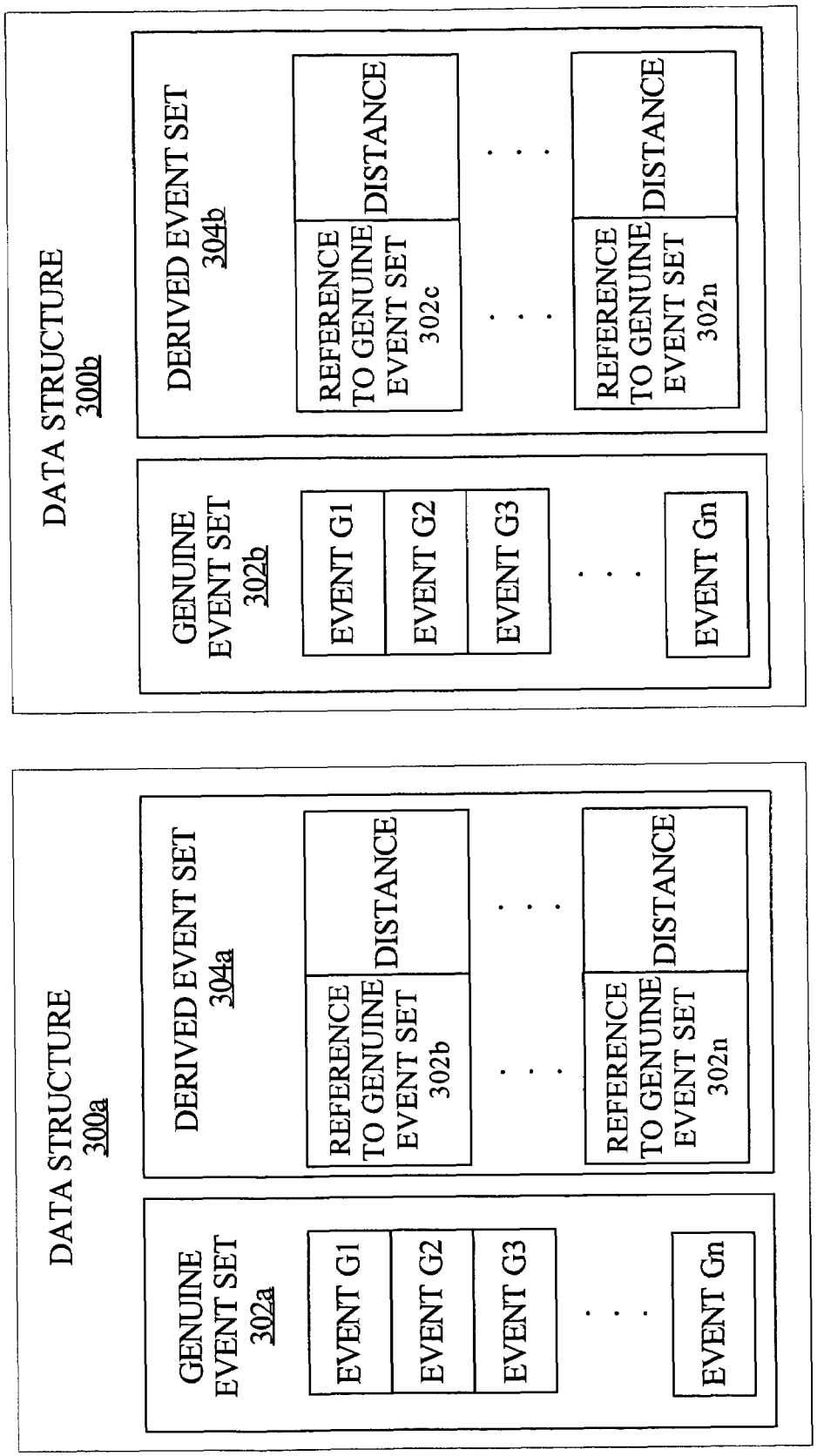
FIG. 3 is a block diagram that illustrates a configuration of a data structure used to track and correlate events occurring in a network, according to an embodiment.

FIG. 3 is a block diagram that illustrates a configuration of a data structure used to track and correlate events occurring in a network, according to an embodiment.

In one embodiment, the derived event set for each data structure comprises a reference to the first set of data associated with each entity that has a dependency relationship with each respective entity. The respective derived event sets are incorporated by reference into each data structure, rather than propagated throughout the network model or duplicated in various data structures. For example, the derived event set 304*a* in data structure 300*a*, which is associated with a first network entity, contains a reference to genuine event set 302*b* in data structure 300*b*, which is associated with a second network entity that has a dependency relationship with the first network entity. Likewise, the derived event set 304*b* in data structure 300*b* contains a reference to a genuine event set 302*c* in a data structure (not shown) that is associated with a third network entity that has a dependency relationship with the second network entity.

In FIG. 3, depiction of a reference to genuine event set 302*n* in each of derived event set 304*a* and derived event set 304*b* does not necessarily mean that this is a reference to the same event set, because the use of n in 302*n* is merely a depiction of a generic element, i.e., a generic depiction of a reference to a generic event set in another entity. However, each entity to which the respective data structures 300*a* and 300*b* are associated (e.g., the first and second entities) may actually have a similar dependency relationship to the same entity and, therefore, have a similar reference to the genuine event set of that same entity.

When an event occurs, it is associated with its respective entity and added only to that entity's genuine event set and does not need to be added to any other entity's data structure because it is automatically added to all relevant derived event sets through the respective references. Derived event sets are, therefore, always current and, at any point in time, contain the set of all events with which the events in the genuine event set of other entities are correlated.

The data structure may be implemented in a number of ways. In one embodiment, for each record listed in the second set of data, information is included in the data structure which indicates how many nodes away (i.e., in the graph), from a node representing the entity to which the data structure is associated, is a node that represents the entity from which the associated event originated. For example, each event listed in the second set of data can be tagged with an attribute referred to as the "distance" of the event, as illustrated in derived event set 204 of data structure 200 (FIG. 2) and derived event sets 304*a*, 304*b* of data structures 300*a*, 300*b* (FIG. 3). If an event is raised against a node N2 on which a given node N1 is directly dependent (i.e., if the event is in N2's genuine event set), the distance is "one". If the event is not raised against N2, but against a third node N3, on which N2 is dependent (i.e., if the event is in N2's derived event set), the distance is increased by 1 for N1's derived set. Both the genuine event set and the derived event set could be combined, where events in the genuine event set would then simply have a distance of "zero".

Figure 4:
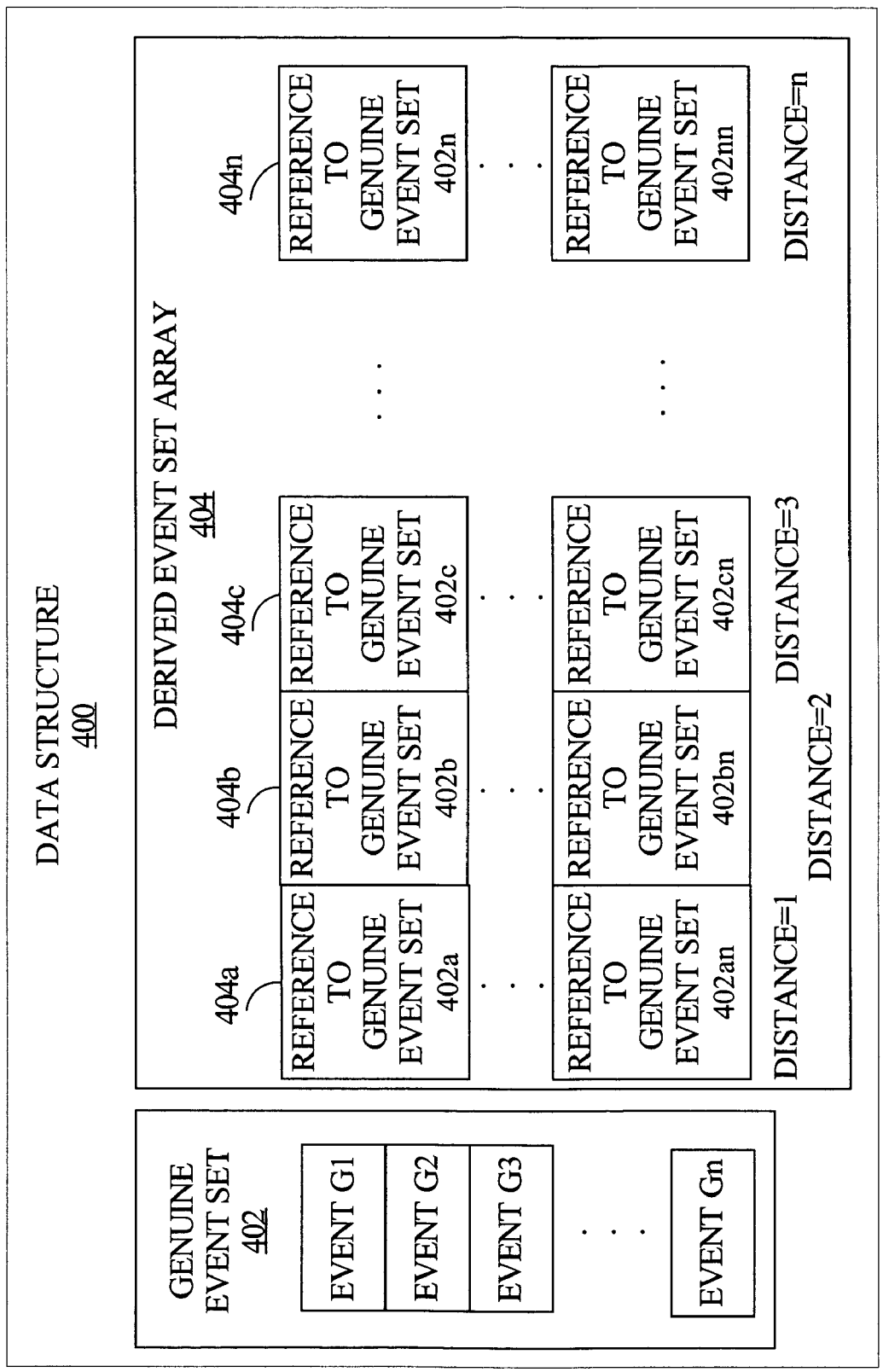
FIG. 4 is a block diagram that illustrates a configuration of a data structure used to track and correlate events occurring in a network, according to an embodiment.

FIG. 4 is a block diagram that illustrates a configuration of a data structure used to track and correlate events occurring in a network, according to an embodiment. In one embodiment, the data structure 400 is configured with the derived event set 404 as (at least effectively) an array of sets of events, in which the position of each set of events in the array indicates the distance between nodes. For example, the first element in the array, 404*a*, contains the information for the set of derived events of distance=1. The set of events of distance=1 is formed as a list of references to other nodes' genuine event sets. The list contains one such reference for each of the other nodes with which this node has a dependency relationship (i.e., in direct layering or topology relationship with) at a distance of one node away in the graph. Similarly, the second element in the array, 404*b*, contains the information for the set of derived events of distance=2. The set of events of distance=2 is formed as a list of references to other nodes' genuine event sets. This list contains one such reference for each of the other nodes with which this node has a dependency relationship (i.e., in direct layering or topology relationship with) at a distance of two nodes away in the graph.

Furthermore, an element n+1 of the array, with n greater than or equal to one, can be formed by referencing element n of the arrays, for each of the other nodes with which this node has a dependency relationship. This is a reference to a reference. For example, a second element of a derived event set array for a first entity, at a distance=2, (e.g., element 404*b*) can reference the first element of derived event set arrays, at a distance=1, of other nodes with which the first entity has such a dependency relationship. Likewise, a third element of a derived event set array for the first entity, at a distance=3, (e.g., element 404*c*) can reference the second element of derived event set arrays, at a distance=2, of other nodes with which the first entity has such a dependency relationship.

Resolution of references involves dereferencing n levels deep, with n corresponding to the respective event distance. This array structure can be optimized such that the dereferencing is not n levels deep but only one level deep, by configuring element n+1 of the array to contain the same references from each element n of the array of the other nodes with which this node has a dependency relationship. Furthermore, the maximum distance of correlated events to consider can be parameterized by putting a bound on the number of elements in the array.

Typically, the data structures are generated for the network entities upon first initialization of a correlation process, described herein, from the current network model. The network model and, therefore, the data structures, should be updated when changes in the network occur, for example, due to reconfiguration and topology changes. Such changes to the network typically occur much less frequently than events occur in the network.

3.0 Method for Correlating Events in a Network

Depending on how the data structures are configured, i.e., whether the derived event set lists events from entities on which the associated entity is dependent, and/or events from entities that are dependent on the associated entity, these data structures can be used to determine the likelihood that: (a) an event in the network, other than an event issued by the entity to which the data structure is associated, caused the event issued by the entity (and, perhaps, other events issued by other entities); and/or (b) one or more events in the network, other than an event issued by the entity to which the data structure is associated, was caused by the event issued by the entity.

In one embodiment, the data structures are used to identify a "correlation candidate set", which identifies one or more events in the network that may be correlated, where correlated events can mean (a) events that may have been caused by propagation of the same event or (b) an event that may have propagated to cause other events. Providing candidate event sets to an inference engine significantly reduces the amount of processing that the inference engine would otherwise need to perform, such as traversing the entire network model to draw inferences based on defined rules, by significantly reducing the "search space" (e.g., the number of network entities, or portion of the network) that the inference engine would otherwise need to search when searching for the root cause fault.

FIG. 5 is a flow diagram that illustrates a method for correlating events occurring in a network, according to an embodiment. The method described in reference to FIG. 5 may be automatically triggered by an event occurring in the network or elsewhere, or may be periodically performed according to a schedule, for example. The method is performed in the context of a network that is or can be represented as a graph of interconnected nodes that represent entities, where the interconnections between nodes represent logical and/or physical dependencies between entities represented by nodes, such as a network topology model graph for a communications network. For example, the method of FIG. 5 could be performed in the context of a network that is illustrated in the graph of FIG. 1B.

At block 502, first data is read from a data structure that is associated with a first network entity. The first data comprises a list of events that originated in association with the first entity, such as genuine event set 202 of data structure 200 (FIG. 2).

At block 504, second data is read from the data structure. The second data comprises a list of records in which each record is associated with an event that originated in association with a network entity that has a dependency relationship with the first entity, such as derived event set 204 of data structure 200 (FIG. 2). As discussed, the data structure can be configured to store, as the derived event set, (1) records for events that originated in association with network entities on which the first entity is dependent; (2) records for events that originated in association with network entities that are dependent on the first entity; or (3) both (1) and (2).

At block 506, information is read that is associated with records in the second data (i.e., the derived event set) that indicates how many nodes away from the node that represents the first entity, is a node that represents the entity from which the associated event originated. For example, the "distance" attribute may be read from derived event set 204 of data structure 200 (FIG. 2) or from derived event sets 304a and 304b of data structures 300a and 300b (FIG. 3), respectively. For another example, the information that indicates the distance between nodes that is read at block 506 may be the position of the corresponding element in an array of derived event data, such as the relative position of elements 404a, 404b, 404c, 404n in derived event set array 404 of data structure 400 (FIG. 4).

Based at least in part on one or more data structures configured as described herein, at block 508, the likelihood that events are correlated is determined. For example, if the derived event set is configured to "point" in the direction of nodes on which a node is dependent, then event correlation can be performed in the context of enabling root cause analysis, such as determining what other events may have caused the events issued against a particular network entity. Likewise, if the derived event set is configured, alternatively or additionally, to "point" in the direction of nodes that are dependent on a node, then event correlation can be performed in the context of enabling fault impact analysis, such as determining what other events may have been caused by the events issued against a particular network entity.

Based at least in part on data structures configured as described herein, at block 510, candidate sets of correlated events are identified. For example, either (1) a set of one or more events that may have caused the first event or (2) a set of one or more events that may have been caused by the first event, or both (1) and (2), are identified. Because the derived event set for a given entity includes all events that are likely correlated with the events in the genuine event set of the entity, if the entity's derived event set is non-empty, then the events in the entity's genuine event set are likely redundant in that they are likely to indicate symptoms of a fault, not root causes of the fault.

The method may in some scenarios yield false positives, such as when different independent failures occur simultaneously on a port and on an interface on the port, where associated events would likely be falsely flagged as correlated. However, the practical impact of false positives is insignificant because the method provides a mechanism for a user to address the situation in which events are falsely identified as correlated. For example, the relative order that various events occurred in the network may be utilized to identify and eliminate false positives. In addition, once one of the seemingly correlated events is cleared, the other event simply persists. Hence, the other event is no longer correlated and can be processed further without the effect of the cleared event.

The techniques described herein can be augmented with other techniques, such as rule-based correlation, that operate on the correlation candidate sets produced by the present techniques to increase the accuracy of the other techniques. This combines the benefits of the high scalability of the present technique with potential benefits of other techniques. For example, using the present techniques to identify the candidate sets of events that are correlated substantially reduces the search domain of the other techniques, thereby providing potentially significant gains in the scale and performance of the other techniques.

4.0 Implementation Mechanisms 4.1 Operating Environment

Figure 6:
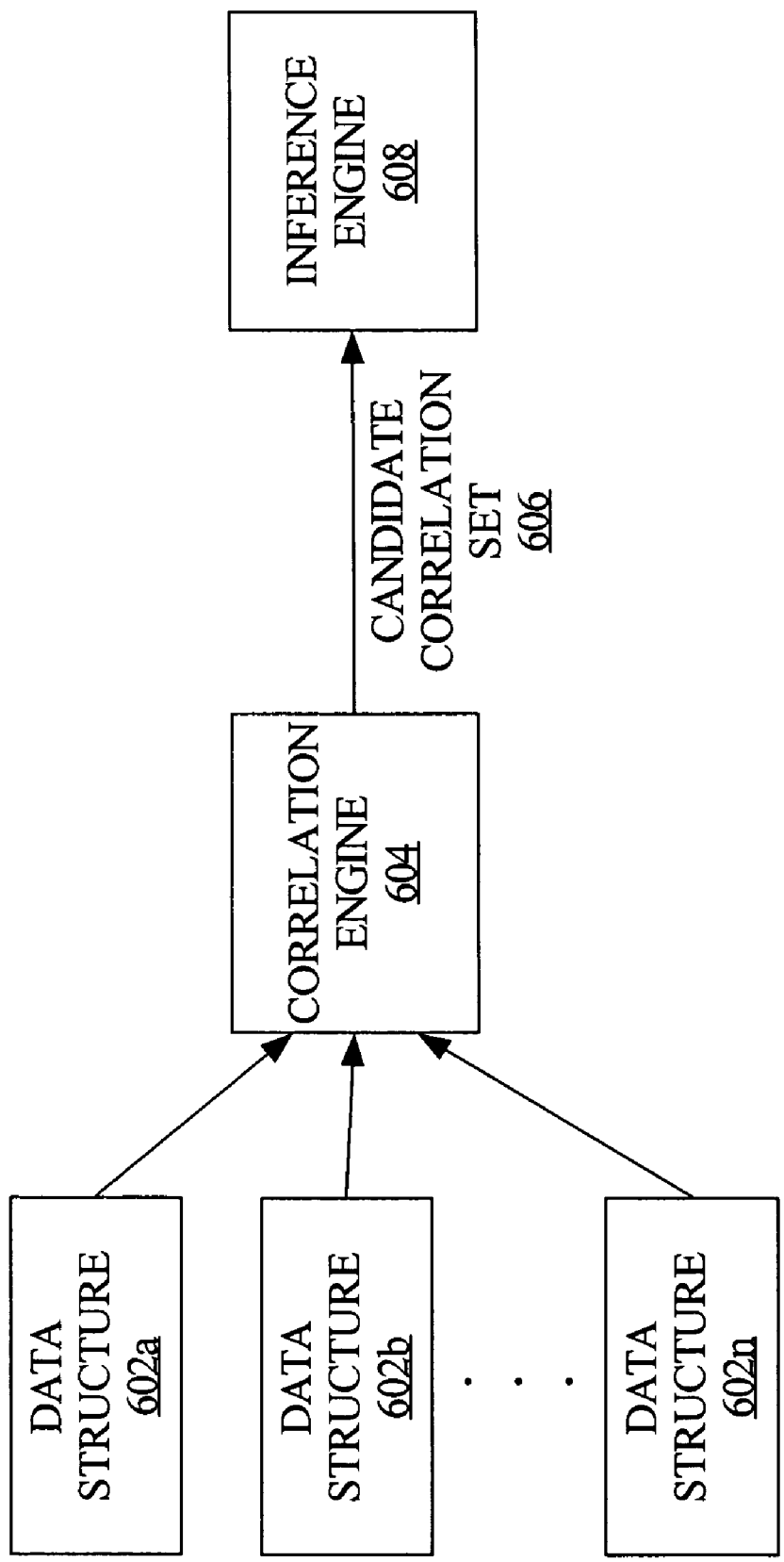
FIG. 6 is a block diagram that illustrates an operating environment in which an embodiment may be implemented.

FIG. 6 is a block diagram that illustrates a simple example of an operating environment in which an embodiment may be implemented.

The operating environment comprises data structures 602a-602n, configured according to one or more embodiments described herein, where each data structure 602a-602n is associated with a network entity, such as a router port or router port interface. A correlation engine 604 can read data structures 602a-602n and process the data contained therein. For example, correlation engine 604 can perform the method described in reference to FIG. 5, based on data structures 602a-602n, to generate one or more candidate event sets 606.

Candidate event sets 606 are sets of one or more events from the genuine event sets of various data structures 602a-602n that are identified as having a likelihood of correlation, e.g., a likelihood that they were all caused by the same root event that occurred in the network. Correlation engine 604 can provide one or more candidate event set 606 to an inference engine 608, such as a rule-based analysis mechanism operated by, for example, a network owner and/or service provider. Inference engine 608 can then perform further processing of the events identified in the candidate event set 606, such as root cause analysis to identify the underlying system fault or impact analysis to identify entities affected by a fault.

4.2 Hardware Overview

Figure 7:
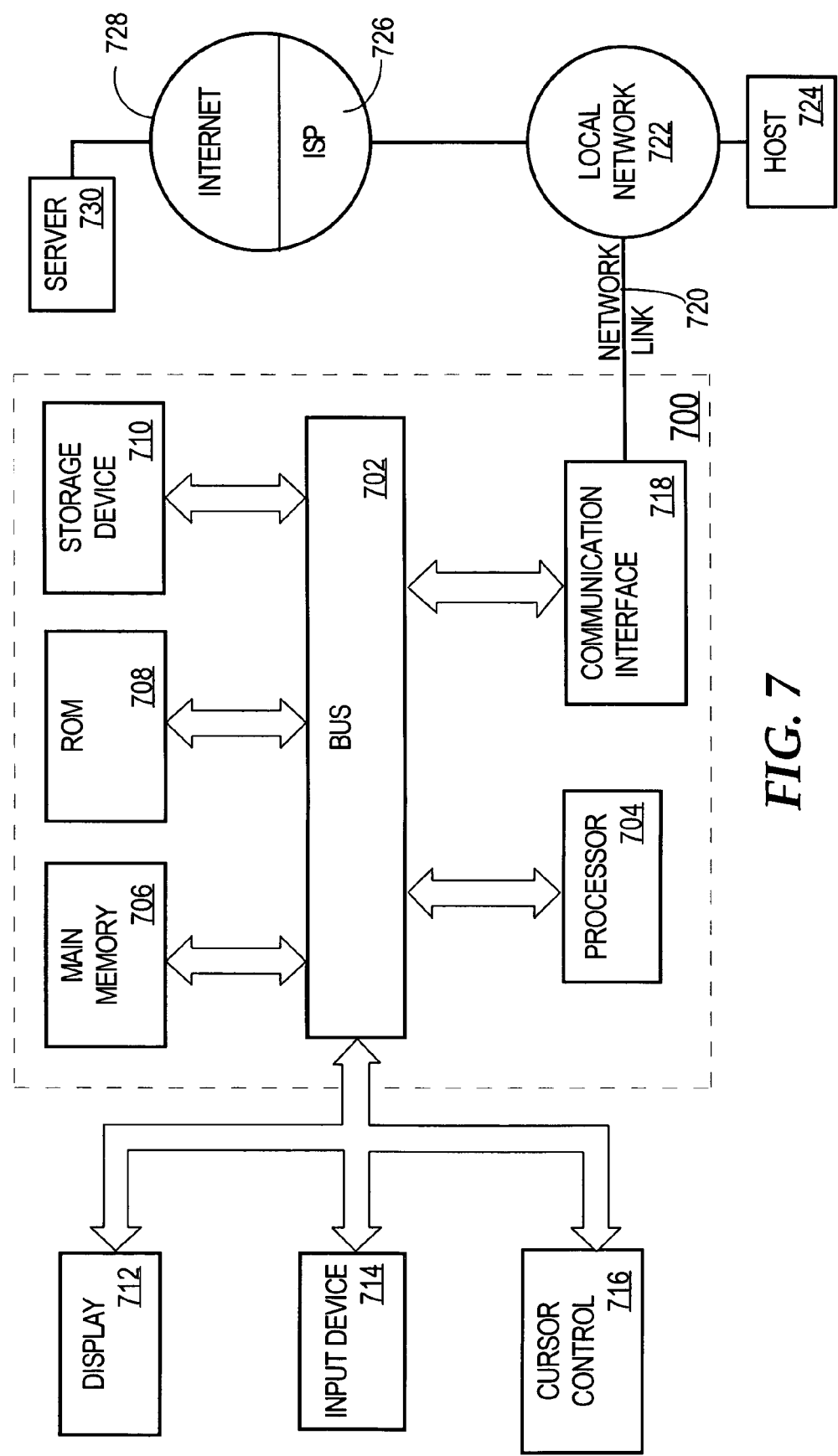
FIG. 7 is a block diagram that illustrates a computer system upon which an embodiment may be implemented.

FIG. 7 is a block diagram that illustrates a computer system 700 upon which an embodiment of the invention may be implemented. For non-limiting examples, an embodiment may be implemented (a) on a system executing a network management application (e.g., an application related to service assurance), (b) as embedded network management instrumentation for topology-aware devices, such as an MPLS (Multi-Protocol Label Switching) edge device, and (c) on a system executing an enterprise management system for management of devices within an enterprise.

Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for auto-correlation of events. According to one embodiment of the invention, auto-correlation of events is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for auto-correlation of events as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for correlating events occurring in a network, wherein the network is represented as a graph of interconnected nodes with interconnections between nodes representing dependencies between the entities represented by the nodes, the method comprising the computer-implemented steps of:

creating a first data structure that is associated with a first entity, wherein the first data structure comprises:

a first set of data that comprises a list of events that originated in association with the first entity, wherein the list of events comprises a first event that originated in association with the first entity, and a second set of data that comprises a list of records, wherein the list of records comprises a record which incorporates by reference a different, second event that originated in association with a different, second entity that has a dependency relationship with the first entity;

wherein the second event is obtained by the first entity through incorporation by reference, without the second entity initiating propagation of the second event to the first entity; and determining, based at least in part on the first data structure, a likelihood that the second event caused the first event or was caused by the first event;

wherein the method is performed by a computing device comprising one or more processors.

2. The method of claim 1, wherein the first data structure comprises:

for the record listed in the second set of data, information that indicates how many nodes away, from a first node that represents the first entity, is a second node that represents the second entity from which the second event incorporated by reference in that record originated.

3. The method of claim 2, wherein the step of determining comprises:

determining, based at least in part on the first data structure, the likelihood that the second event caused the first event.

4. The method of claim 2, wherein the step of determining comprises:

determining, based at least in part on the first data structure, the likelihood that the second event was caused by the first event.

5. The method of claim 2, wherein a data structure configured like the first data structure is associated with each entity in the network, and wherein, for each data structure, the list of records in the second set of data comprises a reference to the first set of data associated with each of one or more entity that has a dependency relationship with the entity associated with the data structure.

6. The method of claim 5, further comprising the computer-implemented step of:

in response to an event originating from the first entity, determining that the event occurred at the first entity; and adding, only to the list in the first set of data in the first data structure, a record of the event that originated in association with the first entity.

7. The method of claim 5, further comprising the computer-implemented step of:

identifying, based at least in part on the data structures, a set of one or more events in the network that may have caused the first event.

8. The method of claim 7, further comprising the computer-implemented step of:

providing the set of one or more events to an inference engine that performs fault analysis of the network.

9. The method of claim 5, further comprising the computer-implemented step of:

identifying, based at least in part on the data structures, a set of one or more events in the network that may have been caused by the first event.

10. The method of claim 9, further comprising the computer-implemented step of:

providing the set of one or more events to an inference engine that performs fault analysis of the network.

11. The method of claim 2, wherein the second set of data comprises a list of records in which each record incorporates by reference an event that originated in association with an entity that is one node away from the node that represents the first entity; and wherein n additional sets of data in the first data structure each comprise a list of records in which each record incorporates by reference an event that originated in association with an entity (a) that has a dependency relationship with the node that represents the first entity and (b) that is n+1 nodes away from the node that represents the first entity.

12. The method of claim 11, wherein the second and the n sets of data are configured as an array of data; and wherein the position of each set of data in the array is the information that indicates how many nodes away, from the node that represents the first entity, are the entities from which the associated events originated.

13. The method of claim 1, wherein the events occurring in the network are associated with faults occurring in the network.

14. The method of claim 1, wherein the network is a packet-switched network.

15. A computer-readable volatile or non-volatile storage medium storing one or more sequences of instructions for correlating events occurring in a network, wherein the network is represented as a graph of interconnected nodes with interconnections between nodes representing logical dependencies between the entities represented by the nodes, which instructions, when executed by one or more processors, cause the one or more processors to perform:

creating a first data structure that is associated with a first entity, wherein the first data structure comprises:

a first set of data that comprises a list of events that originated in association with the first entity, wherein the list of events comprises a first event that originated in association with the first entity, and a second set of data that comprises a list of records, wherein the list of records comprises a record which incorporates by reference a different, second event that originated in association with a different, second entity that has a dependency relationship with the first entity;

wherein the second event is obtained by the first entity through incorporation by reference, without the second entity initiating propagation of the second event to the first entity; and determining, based at least in part on the first data structure, a likelihood that the second event caused the first event or was caused by the first event.

16. The computer-readable medium of claim 15, wherein the first data structure comprises:

for the record listed in the second set of data, information that indicates how many nodes away, from a first node that represents the first entity, is a second node that represents the second entity from which the second event incorporated by reference in that record originated.

17. The computer-readable medium of claim 16, wherein the instructions cause the one or more processors to perform the step of determining by determining, based at least in part on the first data structure, the likelihood that the second event caused the first event.

18. The computer-readable medium of claim 16, wherein the instructions cause the one or more processors to perform the step of determining by determining, based at least in part on the first data structure, the likelihood that the second event was caused by the first event.

19. The computer-readable medium of claim 16, wherein a data structure configured like the first data structure is associated with each entity in the network, and wherein, for each data structure, the list of records in the second set of data comprises a reference to the first set of data associated with each of one or more entity that has a dependency relationship with the entity associated with the data structure.

20. The computer-readable medium of claim 19, wherein the instructions cause the one or more processors to perform:

in response to an event originating from the first entity, determining that the event occurred at the first entity; and adding, only to the list in the first set of data in the first data structure, a record of the event that originated in association with the first entity.

21. The computer-readable medium of claim 19, wherein the instructions cause the one or more processors to perform:

identifying, based at least in part on the data structures, a set of one or more events in the network that may have caused the first event.

22. The computer-readable medium of claim 21, wherein the instructions cause the one or more processors to perform:

providing the set of one or more events to an inference engine that performs fault analysis of the network.

23. The computer-readable medium of claim 19, wherein the instructions cause the one or more processors to perform:

identifying, based at least in part on the data structures, a set of one or more events in the network that may have been caused by the first event.

24. The computer-readable medium of claim 23, wherein the instructions cause the one or more processors to perform:

providing the set of one or more events to an inference engine that performs fault analysis of the network.

25. The computer-readable medium of claim 16, wherein the second set of data comprises a list of records in which each record incorporates by reference an event that originated in association with an entity that is one node away from the node that represents the first entity; and wherein n additional sets of data in the first data structure each comprise a list of records in which each record incorporates by reference an event that originated in association with an entity (a) that has a dependency relationship with the node that represents the first entity and (b) that is n+1 nodes away from the node that represents the first entity.

26. The computer-readable medium of claim 25, wherein the second and the n sets of data are configured as an array of data; and wherein the position of each set of data in the array is the information that indicates how many nodes away, from the node that represents the first entity, are the entities from which the associated events originated.

27. The computer-readable medium of claim 15, wherein the network is a packet-switched network.

28. A system comprising:

a processor;

means for creating a first data structure that is associated with a first entity, wherein the first data structure comprises, a first set of data that comprises a list of events that originated in association with the first entity, wherein the list of events comprises a first event that originated in association with the first entity, and a second set of data that comprises a list of records, wherein the list of records comprises a record which incorporates by reference a different, second event that originated in association with a different, second entity that has a dependency relationship with the first entity;

wherein the second event is obtained by the first entity through incorporation by reference, without the second entity initiating propagation of the second event to the first entity; and means for determining, based at least in part on the first data structure, a likelihood that the second event caused the first event or was caused by the first event.

29. The system of claim 28, wherein the first data structure is configured to store, for the record listed in the second set of data, information that indicates how many nodes away, from a first node that represents the first entity, is a second node that represents the second entity from which the second event incorporated by reference in that record originated.

30. The system of claim 29, wherein the means for determining comprise:

means for determining, based at least in part on the first data structure, the likelihood that the second event caused the first event.

31. The system of claim 29, wherein the means for determining comprise:

means for determining, based at least in part on the first data structure, the likelihood that the second event was caused by the first event.

32. The system of claim 29, wherein a data structure configured like the first data structure is associated with each entity in the network, and wherein, for each data structure, the list of records in the second set of data comprises a reference to the first set of data associated with each of one or more entity that has a dependency relationship with the entity associated with the data structure.

33. The system of claim 32, further comprising:

means for determining that an event occurred at the first entity, in response to the event originating from the first entity; and means for adding, only to the list in the first set of data in the first data structure, a record of the event that originated in association with the first entity.

34. The system of claim 32, further comprising:
means for identifying, based at least in part on the data structures, a set of one or more events in the network that may have caused the first event.

35. The system of claim 34, further comprising:
means for providing the set of one or more events to an inference engine that performs fault analysis of the network.

36. The system of claim 32, further comprising:
means for identifying, based at least in part on the data structures, a set of one or more events in the network that may have been caused by the first event.

37. The system of claim 36, further comprising:
means for providing the set of one or more events to an inference engine that performs fault analysis of the network.

38. The system of claim 29,
wherein the second set of data comprises a list of records in which each record incorporates by reference an event that originated in association with an entity that is one node away from the node that represents the first entity; and
wherein n additional sets of data in the first data structure each comprise a list of records in which each record incorporates by reference an event that originated in association with an entity (a) that has a dependency relationship with the node that represents the first entity and (b) that is n+1 nodes away from the node that represents the first entity.

39. The system of claim 38,
wherein the second and the n sets of data are configured as an array of data; and
wherein the position of each set of data in the array is the information that indicates how many nodes away, from the node that represents the first entity, are the entities from which the associated events originated.

40. The system of claim 28, wherein the network is a packet-switched network.

41. An apparatus for correlating events occurring in a network, wherein the network can be represented as a graph of interconnected nodes with interconnections between nodes representing logical dependencies between the entities represented by the nodes the apparatus comprising:
a network interface that is coupled to the network for receiving one or more packet flows therefrom;
a processor;
one or more stored sequences of instructions which, when executed by the processor, cause the processor to carry out the steps of:
creating a first data structure that is associated with a first entity, wherein the first data structure comprises,
a first set of data that comprises a list of events that originated in association with the first entity, wherein the list of events comprises a first event that originated in association with the first entity, and
a second set of data that comprises a list of records, wherein the list of records comprises a record which incorporates by reference a different, second event that originated in association with a different, second entity that has a dependency relationship with the first entity;
wherein the second event is obtained by the first entity through incorporation by reference, without the second entity initiating propagation of the second event to the first entity; and
determining, based at least in part on the first data structure, a likelihood that the second event caused the first event or was caused by the first event.

42. The apparatus of claim 41, wherein the first data structure is configured to store,
for the record listed in the second set of data, information that indicates how many nodes away, from a first node that represents the first entity, is a second node that represents the second entity from which the second event incorporated by reference in that record originated.

43. The apparatus of claim 42, wherein the instructions further cause the processor to perform the step of determining by:
determining, based at least in part on the first data structure, the likelihood that the second event caused the first event.

44. The apparatus of claim 42, wherein the instructions further cause the processor to perform the step of determining by:
determining, based at least in part on the first data structure, the likelihood that the second event was caused by the first event.

45. The apparatus of claim 42,
wherein a data structure configured like the first data structure is associated with each entity in the network, and
wherein, for each data structure, the list of records in the second set of data comprises a reference to the first set of data associated with each of one or more entity that has a dependency relationship with the entity associated with the data structure.

46. The apparatus of claim 45, and wherein the instructions further cause the processor to perform the step of:
in response to an event originating from the first entity, determining that the event occurred at the first entity; and
adding, only to the list in the first set of data in the first data structure, a record of the event that originated in association with the first entity.

47. The apparatus of claim 45, and wherein the instructions further cause the processor to perform the step of:
identifying, based at least in part on the data structures, a set of one or more events in the network that may have caused the first event.

48. The apparatus of claim 47, and wherein the instructions further cause the processor to perform the step of:
providing the set of one or more events to an inference engine that performs fault analysis of the network.

49. The apparatus of claim 45, and wherein the instructions further cause the processor to perform the step of:
identifying, based at least in part on the data structures, a set of one or more events in the network that may have been caused by the first event.

50. The apparatus of claim 49, and wherein the instructions further cause the processor to perform the step of:
providing the set of one or more events to an inference engine that performs fault analysis of the network.

51. The apparatus of claim 42,
wherein the second set of data comprises a list of records in which each record incorporates by reference an event that originated in association with an entity that is one node away from the node that represents the first entity; and wherein n additional sets of data in the first data structure each comprise a list of records in which each record incorporates by reference an event that originated in association with an entity (a) that has a dependency relationship with the node that represents the first entity and (b) that is n+1 nodes away from the node that represents the first entity.

52. The apparatus of claim 51,
wherein the second and the n sets of data are configured as an array of data; and
wherein the position of each set of data in the array is the information that indicates how many nodes away, from the node that represents the first entity, are the entities from which the associated events originated.

53. The apparatus of claim 41, wherein the network is a packet-switched network.

54. A method for correlating events that occurred in a communications network comprising a plurality of entities, wherein the method comprises the computer-implemented steps of:
   logically representing the network as a graph of interconnected nodes with interconnections between nodes representing logical or physical dependency relationships between the plurality of entities represented by the nodes;
   for each of the plurality of entities, creating, based on the graph, a data structure that comprises
      a genuine event set that comprises a list of event records about fault-related events issued by the entity, and
      a derived event set that comprises a list of event records that are each associated with a fault-related event issued by an entity that has a dependency relationship with the entity,
      wherein each record in the list of records in the derived event set comprises a reference to the genuine event set for each entity that has a dependency relationship with the entity,
      for each record listed in the second set of data, information that indicates how many nodes away, from a node that represents the first entity, is a node that represents the entity from which the associated event originated,
   populating each data structure with data for the genuine event set, the derived event set, the references, and the information;
   wherein populating each data structure with the derived event set comprises obtaining at least one event in the derived event set from an event originating entity through incorporation by reference, without the event originating entity initiating propagation of the at least one event;
   for one or more of the plurality of entities, reading at least some of the data structures to generate one or more candidate sets of events, wherein each candidate set of events contains a plurality of events that are likely related; and
   providing the one or more candidate sets of events for performing fault analysis of the network;
   wherein the method is performed by a computing device comprising one or more processors.

55. The method of claim 54, wherein, for a first entity of the plurality of entities, the plurality of events in a candidate event set likely caused one or more particular events to issue by the first entity.

56. The method of claim 54, wherein, for a first entity of the plurality of entities, the plurality of events in a candidate event set were likely caused by one or more particular events issued by the first entity.

57. A computer-readable volatile or non-volatile storage medium storing one or more sequences of instructions for correlating events that occurred in a communications network comprising a plurality of entities, which instructions, when executed by one or more processors, cause the one or more processors to perform:
   logically representing the network as a graph of interconnected nodes with interconnections between nodes representing logical or physical dependency relationships between the plurality of entities represented by the nodes;
   for each of the plurality of entities, creating, based on the graph, a data structure that is configured to store
      a genuine event set that comprises a list of event records about fault-related events issued by the entity, and
      a derived event set that comprises a list of event records that are each associated with a fault-related event issued by an entity that has a dependency relationship with the entity,
      wherein each record in the list of records in the derived event set comprises a reference to the genuine event set for each entity that has a dependency relationship with the entity,
      for each record listed in the second set of data, information that indicates how many nodes away, from a node that represents the first entity, is a node that represents the entity from which the associated event originated,
   populating each data structure with data for the genuine event set, the derived event set, the references, and the information;
   wherein populating each data structure with the derived event set comprises obtaining at least one event in the derived event set from an event originating entity through incorporation by reference, without the event originating entity initiating propagation of the at least one event;
   for one or more of the plurality of entities, reading at least some of the data structures to generate one or more candidate sets of events, wherein each candidate set of events contains a plurality of events that are likely related; and
   providing the one or more candidate sets of events for performing fault analysis of the network.

58. A system that correlates events that occurred in a communications network comprising a plurality of entities, the system comprising:
   a processor;
   means for logically representing the network as a graph of interconnected nodes with interconnections between nodes representing logical or physical dependency relationships between the plurality of entities represented by the nodes;
   means for creating for each of the plurality of entities, based on the graph, a data structure that is configured to store
      a genuine event set that comprises a list of event records about fault-related events issued by the entity, and
      a derived event set that comprises a list of event records that are each associated with a fault-related event issued by an entity that has a dependency relationship with the entity,
      wherein each record in the list of records in the derived event set comprises a reference to the genuine event set for each entity that has a dependency relationship with the entity,
      for each record listed in the second set of data, information that indicates how many nodes away, from a node that represents the first entity, is a node that represents the entity from which the associated event originated, means for populating each data structure with data for the genuine event set, the derived event set, the references, and the information;

wherein means for populating each data structure with the derived event set comprises means for obtaining at least one event in the derived event set from an event originating entity through incorporation by reference, without the event originating entity initiating propagation of the at least one event;

means for reading, for one or more of the plurality of entities, at least some of the data structures to generate one or more candidate sets of events, wherein each candidate set of events contains a plurality of events that are likely related; and means for providing the one or more candidate sets of events for performing fault analysis of the network.

59. An apparatus for correlating events occurring in a network, the apparatus comprising:

a network interface that is coupled to the network for receiving one or more packet flows therefrom;

a processor;

one or more stored sequences of instructions which, when executed by the processor, cause the processor to carry out the steps of:

logically representing the network as a graph of interconnected nodes with interconnections between nodes representing logical or physical dependency relationships between the plurality of entities represented by the nodes;

for each of the plurality of entities, creating, based on the graph, a data structure that is configured to store a genuine event set that comprises a list of event records about fault-related events issued by the entity, and a derived event set that comprises a list of event records that are each associated with a fault-related event issued by an entity that has a dependency relationship with the entity, wherein each record in the list of records in the derived event set comprises a reference to the genuine event set for each entity that has a dependency relationship with the entity, for each record listed in the second set of data, information that indicates how many nodes away, from a node that represents the first entity, is a node that represents the entity from which the associated event originated, populating each data structure with data for the genuine event set, the derived event set, the references, and the information;

wherein populating each data structure with the derived event set comprises obtaining at least one event in the derived event set from an event originating entity through incorporation by reference, without the event originating entity initiating propagation of the at least one event;

for one or more of the plurality of entities, reading at least some of the data structures to generate one or more candidate sets of events, wherein each candidate set of events contains a plurality of events that are likely related; and providing the one or more candidate sets of events for performing fault analysis of the network.

60. A computer-readable volatile or non-volatile storage medium on which is stored a data structure configured for determining, based on the data structure, the likelihood that an event in a network that is represented as a graph of interconnected nodes with interconnections between nodes representing dependencies between the entities represented by the nodes, other than a first event reported in association with a first entity, caused the first event or was caused by the first event, wherein the data structure is configured to store:

a first set of data that comprises a list of events that originated in association with a first entity, a second set of data that comprises a list of records in which each record incorporates by reference an event that originated in association with an entity that has a dependency relationship with the first entity;

wherein a record in the list of records incorporates by reference an event that originated in association with a second entity that has a dependency relationship with the first entity and wherein the first entity obtains the record from the second entity through incorporation by reference, without the second entity initiating propagation of the event to the first entity; and for each record listed in the second set of data, information that indicates how many nodes away, from a node that represents the first entity, is a node that represents the entity from which the event originated.

* * * * *

UNITED STATES PATENT AND TRADEMARK OFFICE
CERTIFICATE OF CORRECTION

PATENT NO.       : 7,631,222 B2                                  Page 1 of 1
APPLICATION NO.  : 10/924702
DATED            : December 8, 2009
INVENTOR(S)      : Hasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1191 days.

Signed and Sealed this

Twenty-first Day of December, 2010

David J. Kappos
*Director of the United States Patent and Trademark Office*